(12) United States Patent
Klimeck et al.

(10) Patent No.: US 10,311,179 B2
(45) Date of Patent: *Jun. 4, 2019

(54) PHYSICAL MODELING OF ELECTRONIC DEVICES/SYSTEMS

(71) Applicant: Purdue Research Foundation, West Lafayette, IN (US)

(72) Inventors: Gerhard Klimeck, West Lafayette, IN (US); Mykhailo Povolotskyi, West Lafayette, IN (US); Tillmann C Kubis, West Lafayette, IN (US); Ganesh Hegde, Austin, TX (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,459

(22) Filed: Aug. 28, 2018

(65) Prior Publication Data

US 2018/0373826 A1 Dec. 27, 2018

Related U.S. Application Data

(63) Continuation of application No. 15/859,610, filed on Dec. 31, 2017, now Pat. No. 10,061,877, which is a continuation of application No. 14/523,135, filed on Oct. 24, 2014, now Pat. No. 9,858,365.

(60) Provisional application No. 61/895,251, filed on Oct. 24, 2013.

(51) Int. Cl.
    *G06F 17/50* (2006.01)

(52) U.S. Cl.
    CPC ...... *G06F 17/5009* (2013.01); *G06F 2217/16* (2013.01)

(58) Field of Classification Search
    CPC .................................................. G06F 17/5018
    USPC .............................................................. 703/2
    See application file for complete search history.

*Primary Examiner* — Andy Ho
(74) *Attorney, Agent, or Firm* — Purdue Research Foundation

(57) ABSTRACT

A method for modeling a material at least partially-defined by atomic information includes, for each of a plurality of configurations of the material, determining energy moments for a density of states of the respective configuration of the material, and generating a tight binding Hamiltonian matrix for the respective configuration of the material. The method further includes, for each of the plurality of configurations of the material, forming a tight binding model of the configuration of the material by resolving a linking of (i) the energy moments for the density of states of the material to (ii) the tight binding Hamiltonian matrix for the material. Still further the method includes, based on the tight binding models for each of the configurations of the material, forming an environmentally-adapted tight binding model.

20 Claims, 8 Drawing Sheets

PHYSICAL MODELING OF ELECTRONIC DEVICES/SYSTEMS

CROSS-REFERENCE TO RELATED APPLICATIONS

This application is a continuation of U.S. application Ser. No. 15/859,610, filed Dec. 31, 2017, which is a continuation of U.S. application Ser. No. 14/523,135, filed Oct. 24, 2014, which claims the benefit of U.S. Application Ser. No. 61/895,251, filed on Oct. 24, 2013, and entitled, "A Model Complexity Reduction Method to Enable Multi-scale Device Modeling that has Fundamental Atomistic Information," the entireties of which are hereby incorporated by reference.

BACKGROUND OF THE DISCLOSURE

Field of the Disclosure

The present disclosure relates to computational material science methods and, more particularly, to methods for obtaining and utilizing tight binding parameters based on a momentum-resolved density of states.

Brief Description of Related Technology

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Modern semiconductor nanodevices, such as field-effect transistors (FETs), systems-in-package (SiP), system-on-chip (SoC), photonic devices, nanomechanical devices, nanoelectromechanical systems, etc., have reached device dimensions in the range of several nanometers. These devices consist of complicated two and three dimensional geometries and are composed of multiple materials. Typically, about 10000 to 10 million atoms are in the active device regions with additional contacts controlling an injection of current.

Along with developments in semiconductor nanodevices, the area of Computational Material Science has experienced rapid growth, which growth has largely been enabled by the development of sophisticated methods of electronic and atomic structure calculations. From an electronic structure perspective, ab initio schemes such as Density Functional Theory (DFT) have enabled highly accurate calculations of the properties of bulk solids and small atomic clusters. However, a major limitation in utilizations of DFT for the simulation of electronic devices at realistic length scales is the poor scaling of current DFT-based methods with system size. Even the so-called "Order-N" DFT approaches scale poorly when used in self-consistent simulations of systems having atom sizes greater than a few thousand atoms. Thus, the accuracy and ab initio nature of DFT calculations is offset by the fact that current DFT-based methods cannot be used to model realistically extended device geometries containing several thousands to a few million atoms.

Semi-Empirical Tight Binding (SETB) is known to be a scalable and accurate atomistic representation for electron transport for realistically extended nano-scaled semiconductor devices. SETB electronic structure calculations for multi-million atom semiconductor systems, such as quantum dots, single-impurity devices, and disordered SiGe quantum wells, have been successfully utilized to quantitatively explain and predict experimental results. Specifically, in the domain of semiconductor-based nano-electronic transport, SETB basis sets along with Non-Equilibrium Green's Functions (NEGFs) have become the accepted state-of-the-art for quantitative device design.

However, the accuracy of current SETB methods depend critically on careful calibrations of the empirical parameters utilized by the methods. The typical way to determine these SETB parameters is to fit SETB results to experimental band structures. This typical approach to SETB suffers from the following difficulties: (i) parameterizations depends on experimental data that is often not available for new and exotic materials; (ii) SETB basis functions remain unknown, which makes it difficult to predict observables, such as optical matrix elements or charge interaction matrix elements, with high precision.

SUMMARY OF THE DISCLOSURE

In accordance with one example, a method for modeling a material at least partially-defined by atomic information comprises, for each of a plurality of configurations of the material, determining, by a linking module of a computing system, energy moments for a density of states of the respective configuration of the material, and generating, by the linking module, a tight binding Hamiltonian matrix for the respective configuration of the material, wherein the tight binding Hamiltonian matrix is at least partially expressed in terms of one or more tight binding parameters. The method further includes, for each of the plurality of configurations of the material, forming, by a linking module, a tight binding model of the configuration of the material by resolving a linking of (i) the energy moments for the density of states of the material to (ii) the tight binding Hamiltonian matrix for the material, wherein the tight binding model includes determined values of the one or more tight binding parameters. Still further the method includes, based on the tight binding models for each of the configurations of the material, forming an environmentally-adapted tight binding model, wherein the environmentally-adapted tight binding model models the material for environmentally-dependent variations in the atomic information of the material.

In another embodiment, a non-transitory computer-readable storage medium has stored thereon a set of instructions that specially configure a computing device such that, when executed by one or more processors, the instructions cause the computing device to, for each of a plurality of configurations of the material, determine energy moments for a density of states of the respective configuration of the material. The instructions further cause the computing device to, for each of a plurality of configurations of the material, generate a tight binding Hamiltonian matrix for the respective configuration of the material, wherein the tight binding Hamiltonian matrix is at least partially expressed in terms of one or more tight binding parameters, and form a tight binding model of the configuration of the material by resolving a linking of (i) the energy moments for the density of states of the respective configuration of the material to (ii) the tight binding Hamiltonian matrix for the respective configuration of the material, wherein the tight binding model includes determined values of the one or more tight binding parameters. Still further, the instruction cause the computing device to, based on the tight binding models for each of the configurations of the material, form an environmentally-adapted tight binding model, wherein the environmentally-adapted tight binding model models the material for environmentally-dependent variations in the atomic information of the material.

In yet another embodiment, a system comprises a storage mechanism to store data indicative of an tight binding model, wherein the tight binding model is configured to model properties of a material at least partially-defined by atomic information, one or more processors, and one or more non-transitory memories coupled to the one or more processors. The one or more non-transitory memories include computer executable instructions stored therein that specially configure the one or more processors such that, when executed by the one or more processors, the computer executable instructions cause the computer device to: determine energy moments for a density of states of the of the material, and generate a tight binding Hamiltonian matrix for the material, wherein the tight binding Hamiltonian matrix is at least partially expressed in terms of one or more tight binding parameters. The computer executable instructions further cause the computer device to: form a tight binding model of the material by resolving a linking of (i) the energy moments for the density of states of the material to (ii) the tight binding Hamiltonian matrix for the material, wherein the tight binding model includes determined values of the one or more tight binding parameters, and store a representation of the tight binding model, including the values of the one or more tight binding parameters, using the storage mechanism.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION OF PREFERRED EMBODIMENTS

Figure 1:
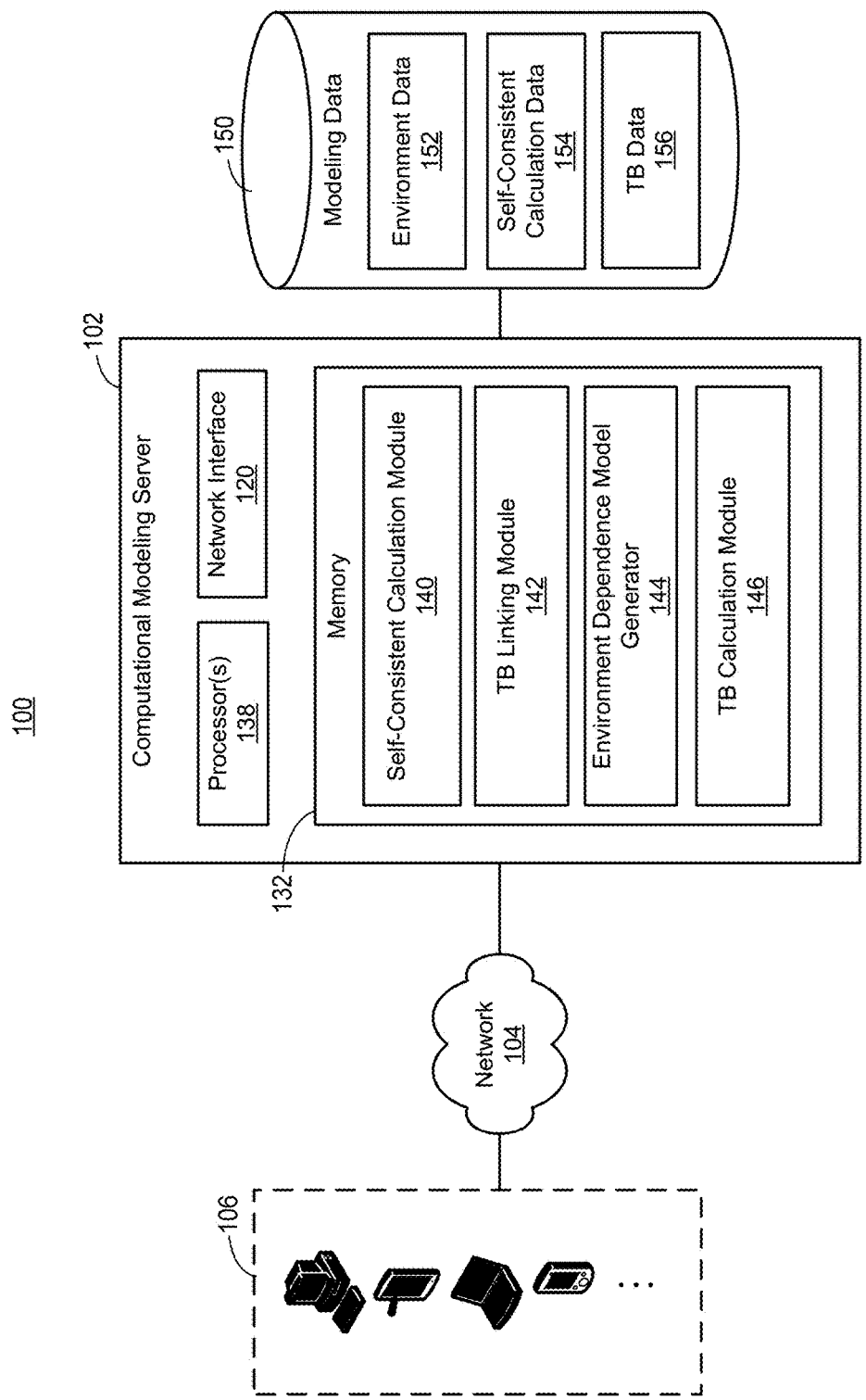
FIG. 1 is a block diagram of an example system for obtaining and utilizing tight binding parameters based on momentum-resolved density of states.

The techniques of the present disclosure allow tight binding parameters to be generated based on self-consistent ab-initio calculations. These tight binding parameters may define parameters, such as on-site energies or two-center integrals, utilized by tight binding models or may define tight binding basis functions. Once generated, the tight binding parameters may be utilized to model modern semiconductor nanodevices (e.g., devices having at least one dimension on the order of several nanometers), along with a variety of other devices or systems. Because the tight binding parameters are generated based on ab-initio calculations, such as Density Functional Theory (DFT) calculations, tight binding methods utilizing the tight binding parameters are able to model densities of states, and other properties of nanodevices, with substantially similar accuracy as that of DFT methods, while maintaining the scalability of tight binding methods.

Further, the techniques disclosed may be repetitively implemented to generate tight binding parameters for a variety of interatomic distances, atomic-coordinates, alloy concentrations, etc. to model environment dependence of tight binding parameters. That is, a computing device may repeat methods described herein to calculate tight binding parameters, or basis functions, for a variety of strains/atomic environments. Environmental dependence of the tight binding parameters emerges naturally out of this repetitive process, which emergence is in contrast to currently existing techniques utilizing an ad hoc model of environmental dependence a priori.

The below description includes references to "Tight Binding" (TB) models, parameters, calculations, etc. These TB models, parameters, calculations, etc. may include some similarities current Semi-Empirical Tight Binding (SETB) methods, such as in the naming of parameters. However, in contrast to current tight binding methods such as SETB, the TB models, parameters, calculations, etc. of the current disclosure may utilize at least some parameters and/or basis functions that are generated based on ab-initio (e.g., DFT) calculations and which account for variations in an environment via naturally emerging models, as discussed further with reference to FIGS. 2, 3, and 4. Generally, "Tight Binding" as referred to below may refer to a model including representations (e.g., via sparse matrices) of nearest neighbor (NN) and/or second Nearest Neighbor (2NN) couplings or interactions amongst the components (e.g., atoms) of a material. A TB model may also utilize a parameterized Hamiltonian (obviating a need to compute multi-center integrals) and an orthogonal basis (also allowing the use of sparce matrix representations). Generally, the Tight Binding models of the present disclosure may be transferable within a class of material systems (e.g., InGaAlAs or SiGe), represent strain and realistic distortion in an atomistic manner, and utilize at least some localization of a basis to represent nano-scale structures, or structures on another suitable scale, within a material (e.g., at finite contact regions).

System Overview

FIG. 1 illustrates an example computing system 100 (or just "system") for generating tight binding parameters for based on self-consistent ab-initio calculations. The example system 100 may include a computational modeling server 102 communicatively connected to one or more user devices 106 via a network 104. When prompted by the user devices 106 and/or at any other suitable times (e.g., at a time determined by a job scheduling system, not shown), the computational modeling server 102 may generate tight binding parameters and/or environment dependence models and utilize previously generated tight binding parameters via one or more specially configured functions of the computational modeling server 102.

Specifically, the computational modeling server 102 may include one or more non-transitory server memories 132 storing one or more specialized modules, routines, engines, etc. that, when executed by one or more processors 138, may cause the computational modeling server 102 to at least partially implement some the methods discussed herein. The self-management server 108 may further include a system bus (not shown) that couples various system components including the memory 132 to the processors 138. The system bus may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The memory 132 may include an assortment of computer-readable media, where computer-readable media may be any media that may be accessed by the computational modeling server 102. By way of example, and not limitation, the media may include both transitory and non-transitory media, removable and non-removable media. For example, the memory 132 may include non-transitory media such as RAM, ROM, EEPROM, or other memory technology, optical storage disks, magnetic storage devices, and any other non-transitory medium which may be used to store computer-accessible information. In particular, the memory 132 may store one or more specially configured engines, applications or modules including a self-consistent calculation module 140, a self-consistent to Tight Binding (TB) linking module 142, an environment dependence model generator 144, and a TB calculation module 146. Although each of the modules/generators 140, 142, 144, and 146 are illustrated as separate modules stored in the memory 132, some implementations of the system 100 may combine and/or separate the functionality of the modules/generators 140, 142, 144, and 146 into any number of distinct engines, modules, applications, routines, generators, etc.

In some implementations, all or at least some of the modules/generators 140, 142, 144, and 146 may utilize, generate, and/or modify data stored on a data storage device 150 (e.g., including optical storage disks, magnetic storage devices, etc.). For example, the computational modeling server 102 may query data from and store data on the data storage device 150 via any suitable combination of data structures, formats, protocols, languages, access/storage mechanisms, etc.

Although one computational modeling server 102 and one data storage device 150 is depicted in FIG. 1, some implementations of system for generating and utilizing tight binding parameters may include different numbers of servers and data storage devices. In particular, the processing performed by the computational modeling server 102 may be distributed among a plurality of servers in an arrangement known as "cloud computing," and the data stored in the data storage device 150 may be distributed among a plurality of data storage devices, in an embodiment. This configuration may provide several advantages, such as, for example, enabling near real-time uploads and downloads of information as well as periodic uploads and downloads of information.

As mentioned above, the user devices 106 may interact with the computational modeling server 102 to initiate a generation or utilization of tight binding parameters via the network 104. In some implementations, operators of the user devices 106 may also configure, view output from, visualize output from, modify, or otherwise interact with the modules/generators 140, 142, 144, and 146 via the user devices 106 and the network 104. The network 104 may include a local area network, the Internet, a metropolitan area network (MAN), a wide area network (WAN), or any other suitable network allowing the user devices 106 to interact with the computational modeling server 102 or data accessible via the computational modeling server 102. The network 104 may also allow the computational modeling server 102 to interact with the user devices 106 along with servers, such as web servers, email servers, etc., or systems (e.g., via the network interface 120)

The user devices 106 may include, by way of example, a desktop computer, laptop computer, smartphone, tablet computer, gaming system, or other personal computing device that is in communicative connection with a network 104 via one or more wired or wireless connections. Although not shown FIG. 1, the user devices 106 may include also include all or many of the components depicted in the computational modeling server 102. As such, in some cases, one or more of the user devices 106 and/or the computational modeling server 102 may operate substantially in isolation as a "stand alone" device to generate and utilize tight binding parameters. Generally, the functionality discussed herein to generate and utilize tight binding parameters may be divided in any suitable manner between the user devices 106 and the computational modeling server 102.

Self-Consistent Ab-Initio Calculations

The self-consistent calculation module 140 may specially configure the computational modeling server 102 such that, when executed by the processors 138, the self-consistent calculation module 140 causes the computational modeling server 102 to perform one or more ab-initio electronic structure calculations. For example, the self-consistent calculation module 140 may implement one or more Density Functional Theory (DFT) methods to generate, among other things, eigenvalues and eigenvectors (e.g., functions) corresponding to a "Kohn-Sham" (KS) system, which KS system is associated with a particular atomic, molecular, or periodic system.

DFT methods implemented by the self-consistent calculation module 140 may facilitate a self-consistent solution to a set of KS equations to obtain a set of ground state (e.g., energy minimizing) eigenfunctions of a KS system. The KS system is a system of non-interacting particles whose density (e.g., electron or particle density) is the same as that of a realistic system of interest, for which the calculation is being performed. The self-consistent calculation module 140 may perform such a calculation using any number of energy "functionals" that express energies of the system (e.g., Kinetic, Hartree, exchange-correlation, etc.) in terms of the electron density of the system.

By way of example, the DFT method implemented by the self-consistent calculation module 140 may receive as input interatomic distances, indications of types of atoms (e.g., elements), geometries of a periodic system (e.g., lattice parameters or crystal structures), definitions or indications of energy functionals, grid spacings, basis function parameters, basis function definitions, spin parameters (e.g., polarized or unpolarized), occupation numbers, and/or any other number of parameters/definitions utilized by the implemented DFT method. As output, the self-consistent calculation module 140 may generate data in any suitable form, which data represents eigenvalues (e.g., orbital energies) and eigenfunctions (e.g., KS orbitals) of the KS system. The self-consistent calculation module 140 may further output various ground state material properties derivable from the electron density (e.g., via functionals) or components of the KS system (e.g., energies and orbitals), such as infrared spectra, indications of near optimized geometries, total energies of the realistic system, etc.

In some implementations, the self-consistent calculation module 140 may utilize data stored in the data storage device 150 during calculations and/or may output data to the data storage device 150. In particular, the self-consistent calculation module 140 may utilize environment data 152 and/or self-consistent calculation data 154. The environment data 152 may include data (e.g., files) defining geometries (e.g., lattice parameters and crystal structures), components ratios or concentrations of one or more alloys, atomic coordinates, etc. of one or more particular types of materials, and the self-consistent calculation data 154 may define basis functions, functionals, algorithms, psuedopotentials, default variable values, etc. utilized by the self-consistent calculation module 140. In one scenario, the self-consistent calculation module 140 may calculate a band structure, or density of states, for Silicon based on psuedopotentials and basis functions defined in the self-consistent calculation data 154 and based on crystal structures and geometries of Silicon defined in the environment data 152.

Although the self-consistent calculation module 140 may utilize data stored in the data storage device 150, generally the self-consistent calculation module 140 may operate without accessing the data storage device 150 (e.g., by accessing necessary information stored locally in the memory 132). Further, the self-consistent calculation module 140 may utilize information (definitions of functionals, definitions of basis functions, definitions of grids, etc.) provided by the user device 106 (e.g., as configuration files) along with data stored in the data storage device 150 and/or in the memory 132 to perform ab-initio calculations.

Further, although DFT calculations are emphasized herein as the ab-initio calculations generating densities of states and other properties, some implementations of the self-consistent calculation module 140 may utilize ab-initio methods other than Kohn-Sham DFT to generate densities of states and other properties of materials. For example, the self-consistent calculation module 140 may utilize GW, Green's function, orbital-free DFT, hybrid DFT functionals (e.g., including a mixing of exact exchange), etc. to calculate a one or more densities of states that may be utilized by the TB linking module 142 or other modules of the computational modeling server 102.

TB Parameter Generation

The TB linking module 142 may specially configure the computational modeling server 102 such that, when executed by the processors 138, the TB linking module 142 causes the computational modeling server 102 to generate TB parameters/functions based on ab-initio calculations (e.g., performed by the self-consistent calculation module 140). In some implementations, the self-consistent calculation module 140 may transmit results (e.g., angular momentum resolved densities of states) to the TB linking module 142 such that the TB linking module 142 can compute TB parameters. Alternatively or additionally, the TB linking module 142 may, at certain times (e.g., when prompted by one of the user devices 106) trigger the self-consistent calculation module 140 to produce certain ab-initio results, which results are subsequently utilized by the TB linking module 142.

Figure 2:
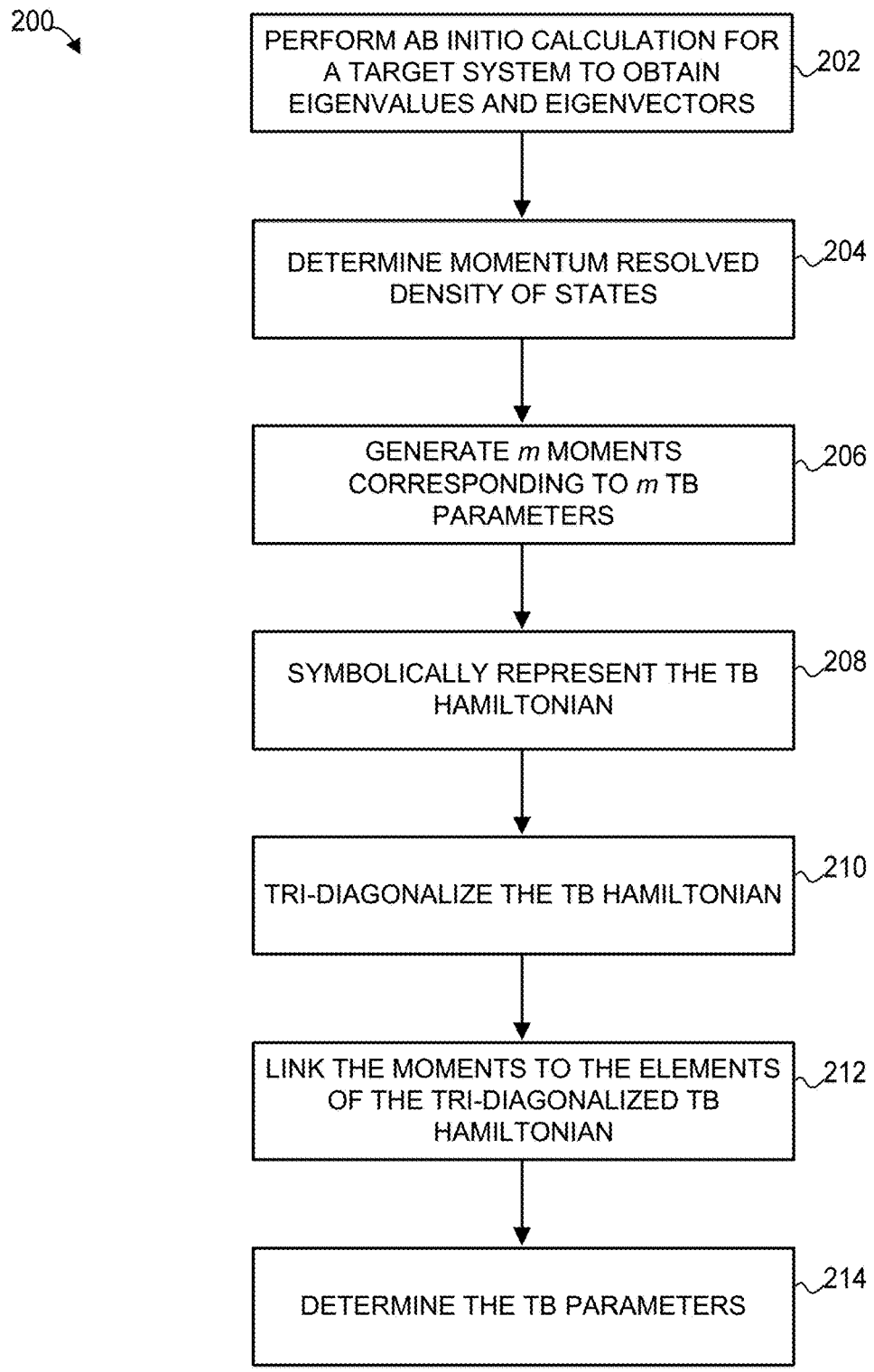
FIG. 2 is a flow diagram of an example method for generating tight binding parameters which can be implemented in the system illustrated in FIG. 1.

FIG. 2 is a flow diagram of an example method 200 for producing tight binding parameters based on the results of ab-initio calculations. The TB linking module 142 and the self-consistent calculation module 140 of the computational modeling server 102 may implement at least some portions of the method 200, for example.

Referring to FIG. 2, an ab-initio calculation is performed for a target system to obtain corresponding eigenvalues and eigenvectors (block 202). The self-consistent calculation module 140 may, for example, perform a calculation for a target system (e.g., a certain periodic or crystalline structure including particular types of atoms at particular locations within a unit cell) based on one or more DFT methods. Such calculations are further discussed in the above section entitled "Self-Consistent Ab-Initio Calculations." This calculation may result in an output (e.g., from the self-consistent calculation module 140) of various eigenvalues (e.g., energies) and eigenvectors, eigenfunctions, or orbitals of a KS system. The eigenvalues and eigenvectors may be represented in any suitable format, such as a format including a series of numbers in units of electron Volts (eV) and a series of coefficients of basis functions utilized in the calculation (e.g., plane waves), respectively.

The target system for which the ab-initio calculation is performed and for which TB are generated, as discussed below, may include any suitable clusters, slabs, bulk solids, alloys, interfaces, regardless of the type of elements therein. In some implementations, the target system is a suitable combination of the following classes of materials: a III-V semiconductor material, a group IV semiconductor material, a metal, a polymer, or an insulator. By way of example, the materials of the target system may be a semiconductor S, a binary semiconductor alloy $S1_xS2_y$ such that x+y=1, a target or ternary semiconductor alloy $S1_xS2_yS3_z$ such that x+y+z=1, a metal/semiconductor heterostructure I|S, a metal-dielectric-semiconductor nanostructure M|I|S, an insulator-dielectric nanostructure I|S, a metal-dielectric nanostructure M|I, or a metal-metal nanostructure M1|M2. In these example cases, the semiconductor S may be an elemental semiconductor, the semiconductor alloy $S1_xS2_y$ may include any possible compound alloy semiconductors, the ternary semiconductor $S1_xS2_yS3_z$ may include any possible ternary compound alloy semiconductors, the metals M, M1, M2 are any elemental or compound solid having the property of metallic conduction, and the dielectric I is any compound that has the property of being polarized by internal or applied electric fields.

An angular momentum resolved local density of states is then determined from the output of the ab-initio calculation (block 204). The density of states may describe a number of states (e.g., of electrons) per interval of energy at each energy level accessible to a system (e.g., as represented in a band structure). The density of states may be an "atom-projected" and angular momentum resolved local density of states (MRLDOS), $g_{il}$, defined as:

$$g_{il}(E) = \sum_n |\langle \psi_n | \phi_{i,l} \rangle|^2 \delta(E - E_n)$$

where ψ represents the n eigenfunctions of the KS system and where $\phi_{i,l}$ represents the basis functions utilized in the ab-initio calculation corresponding to atomic site i and angular momentum I. The self-consistent calculation module 140 may generate the MRLDOS as a post-processing step of the ab-initio (e.g., DFT) calculation, or the self-consistent calculation module 140 may transmit indications of the eigenfunctions to the TB linking module 142, which TB linking module 142 calculates the MRLDOS. Generally, the MRLDOS represents the contribution of a particular angular momentum I at an atomic site i (e.g., within a periodic structure, such as crystalline Silicon) towards the total density of states (DOS). A summing of the MRLDOS over all angular momenta and atomic sites in a unit cell of a periodic structure may yield the total DOS in the unit cell.

m energy moments are then computed from the MRLDOS (block 206), where m is the number of TB parameters (e.g., unknown TB parameters) being generated. The m energy moments, $\mu^{(m)}$, may be calculated as the ratio:

$$\mu_{il}^{(m)} = \frac{\int E^m g_{il}(E) dE}{\int g_{il}(E) dE}$$

A tight binding (TB) Hamiltonian is then represented symbolically (block 208). The TB linking module 142 may, for example generate a symbolic representation of the TB Hamiltonian in terms of various tight binding parameters. By way of example, these tight binding parameters may include parameters utilized in a representation of tight binding basis functions. For example, the tight binding basis functions may be represented as:

$$\Phi_{n,l,m}(\vec{r}) \equiv \Phi_{n,l,m}(r,\theta,\phi) = R_{n,l}(r) Y_{l,m}(\theta,\phi)$$

where the radial part of the functions are parameterized by $$R_{n,l}(r) = \sum_{i=1}^{N} [\gamma_i \sin(\lambda_i r) + \omega_i \cos(\lambda_i r)] r^{n-1} \exp(-\alpha_i r)$$

and $\gamma_i$, $\omega_i$, $\lambda_i$, and $\alpha_i$ may be TB parameters to be determined or may be pre-determined properties of the basis functions. TB parameters may also include on-site energies, two-center integrals, tunneling parameters, inter-atomic matrix elements or interactions, intra-atomic matrix elements or interactions, and any other number of parameters utilized to parameterize a tight binding model, or to parameterize basis functions utilized in a tight binding model. Some or all of these TB parameters may be included in the m TB parameters generated using this example method 200.

Next, the symbolically represented TB Hamiltonian is converted to a tri-diagonal form (block 210). In some implementations, the TB linking module 142 may utilize a recursive method, such as the method of Haydock et al. ("Electronic structure based on the local atomic environment for tight-binding bands," Journal of Physics C: Solid State Physics, volume 5, page 2845, 1972) or the method of the Lanczos algorithm. For example, the TB linking module 142 may perform a tri-diagonalization of the TB Hamiltonian involving successive orthonormalization of an initial vector or function (e.g., a recursion orbital). If an initial recursion orbital is $|0\rangle$, then the TB linking module 142 may form a new recursion orbital from the symbolic Hamiltonian, where the new recursion orbital is:

$$|\tilde{1}\rangle = H|0\rangle - a_0|0\rangle.$$

If $|\tilde{1}\rangle$ is orthogonal to $|0\rangle$, then $$a_0 = \langle 0|H|0\rangle,$$

where $a_0$ is a recursion coefficient. Further, the TB linking module 142 may generate an orthonormal orbital $|1\rangle$ from $|\tilde{1}\rangle$ using:

$$|1\rangle = \frac{1}{b_1}|\tilde{1}\rangle,$$

where $b_1$ is another recursion coefficient and is given by:

$$b_1^2 = \langle \tilde{1}|\tilde{1}\rangle.$$

The TB linking module 142 may form subsequent recursion orbitals according to:

$$|\widetilde{i+1}\rangle = H|i\rangle - a_i|i\rangle - b_i|i-1\rangle,$$

with the coefficients being determined by:

$$b_i^2 = \langle \tilde{i}|\tilde{i}\rangle, \text{ and}$$

$$a_i = \langle i|H|i\rangle.$$

This successive orthonormalization, and/or any other suitable tri-diagonalization methods implemented by the TB linking module 142, may generate an orthonormal basis in which the symbolic Hamiltonian is represented as:

$$\overline{H} = \begin{bmatrix} a_0 & b_1 & 0 & 0 & 0 & \dots \\ b_1 & a_1 & b_2 & 0 & 0 & \dots \\ 0 & b_2 & a_3 & b_3 & 0 & \dots \\ \vdots & \vdots & \ddots & \ddots & \ddots & \dots \\ \vdots & \vdots & \ddots & \ddots & \ddots & \dots \\ \vdots & \vdots & \ddots & \ddots & \ddots & \dots \end{bmatrix}.$$

The recursion coefficients a and b now include, or are expressed in terms of, the TB parameters utilized to express the TB Hamiltonian in symbolic form. In some implementations, the TB linking module 142 may repeat a recursive tri-diagonalization, similar to that described above, to generate a set of recursion coefficients for each angular momentum s, p, and d.

The recursion coefficients may then be linked to the moments of the MRLDOS, and, because the recursion coefficients are composite expressions involving the TB parameters, the moments of the MRLDOS are linked to the TB parameters (block 212). For example, the TB linking module 142 may link the recursion coefficients to the moments of the MRLDOS using a series of expressions or equations, such as:

$$\mu^{(1)} = a_0$$

$$\mu^{(2)} = a_0^2 + b_1^2$$

$$\mu^{(3)} = a_0^3 + 2a_0 b_1^2 + a_1 b_1^2$$

$$\mu^{(4)} = a_0^4 + 3a_0^2 b_1^2 + 2a_0 a_1 b_1^2 + a_1^2 b_1^2 + b_1^4 + b_1^2 b_2^2$$

$$\vdots$$

In some cases, the TB linking module 142 may utilize a similar series of equations for each angular momentum s, p, and d corresponding to each set of recursion coefficients. The TB linking module 142 may generally generate these sets of equations from the tri-diagonal Hamiltonian, $\overline{H}$. For example, the TB linking module 142 may generate the equation utilized to relate moment m to recursion coefficients using the top-left m components of $\overline{H}$, or $\overline{H}^m$. In this manner, the TB linking module 142 may forms sets of equations which relate the moments of the MRLDOS (which are known and obtained from the ab-initio calculation of block 202) to symbolic, algebraic expressions involving the unknown TB parameters (e.g., the polynomials expressions above including recursion coefficients a and b, which recursion coefficient are expressed in terms of the TB parameters).

In some implementations, a theorem relating moments of the MRLDOS and to closed electron-paths may underpin the procedure discussed above to link moments of the MRLDOS to TB parameters. For example, because the $m^{th}$ moment of the LDOS at an atomic site is the sum of all closed electron paths beginning and ending at the same site, μ may be expressed as:

$$\mu_{il}^{(m)} = \langle \phi_{il} | \overline{H}^m | \phi_{il} \rangle.$$

Thus, if the LDOS, or MRLDOS, is generated by methods other than tight binding, such as ab-intitio (e.g., DFT) methods, a TB parameterization may be generated by linking the moments of the MRLDOS to TB parameters, as described above.

Returning again to FIG. 2, upon obtaining the equations linking the moments and TB parameters, the system of equations may be solved to generate the TB parameters (block 214). As this system likely includes non-linear equations, the TB linking module 142 may implement one or a variety of methods to solve a system of non-linear equations. For example, the TB linking module 142 may implement one or a suitable combination of root-finding, trust-region reflective, trust-region dogleg, Levenberg-Marquardt, Newton's method, secant method, etc. algorithms. However, in general, the TB linking module 142 may implement any number of linear, non-linear, or other suitable solvers to solve expressions relating MRLDOS moments to TB parameters. In some cases, the TB linking module 142 may also store TB parameters in the data storage device 150 (e.g., in TB data 156).

Figure 3:
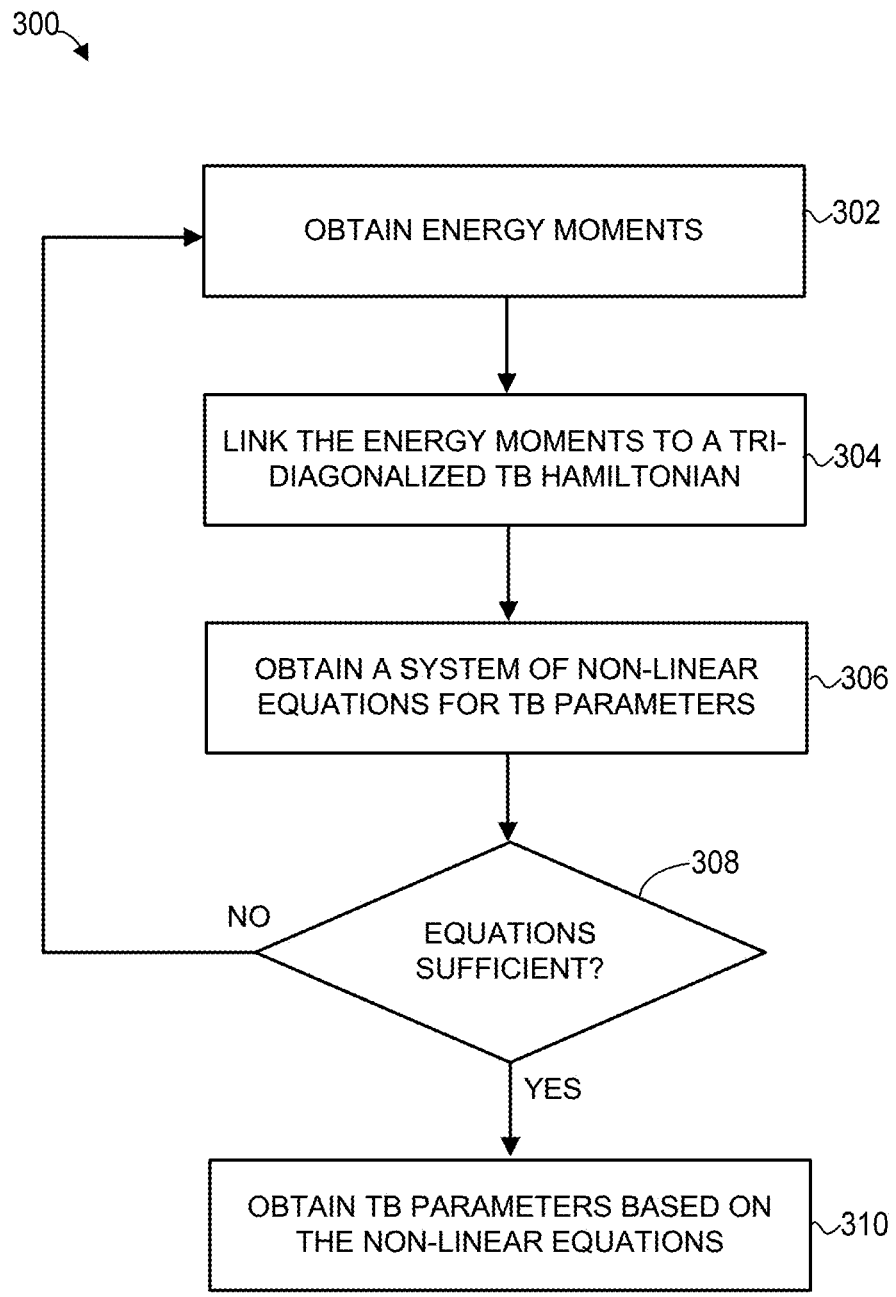
FIG. 3 is a flow diagram of an example method for iteratively generating tight binding parameters which can be implemented in the system illustrated in FIG. 1.

In some implementations, certain portions of the above procedure to produce TB parameters may be iterative. For example, only a certain number of non-linear equations relating energy moments and TB parameters may be produced initially. Then, if further equations are necessary to solve for the TB parameters, the procedure to obtain linking equations may be repeated. FIG. 3 is a flow diagram of an example method 300 for iteratively obtaining TB parameters in such a manner. The TB linking module 142 and/or the self-consistent calculation module 140 of the computational modeling server 102 may implement at least some portions of the method 300, for example.

In the example method 300, an initial set of energy moments are obtained (block 302). The self-consistent calculation module 140 may, for example, perform a calculation for a target system, and the self-consistent calculation module 140 and/or the TB linking module 142 may generate the initial set of energy moments from a MRLDOS. The energy moments are then linked to components of a tri-diagonalized TB Hamiltonian (block 304) to obtain a system of non-linear equations for TB parameters (block 306), as discussed further with reference to FIG. 2.

In some scenarios, the system of equations obtained at 306 (e.g., a system of non-linear equations) may not be sufficient in number or type (e.g., non-invertable) to obtain the TB parameters. As such, the method 300 may include determining if the equations generate at block 306 are sufficient to solve for the TB parameters. In a number and/or type of the equations is not sufficient to solve for the TB parameters (e.g., if a number of the equations is not equal to or greater than a number of unknown TB parameters), the flow may revert to block 302, where additional and/or new moments are generated such that additional equations may be generated. In some cases, such a reverting or iterating of this process may involve a trigging of the self-consistent calculation module 140 to perform a new calculation, where the new calculation includes the same target system with varied parameters (e.g., geometries, grid spacings, basis function definitions, etc.) or for different target systems. In other cases, the reverting or iterating of the process may include a calculation of further energy moments (e.g., higher m values) from a pre-calculated (e.g., in a first instance of block 302) MRLDOS.

When it is determined that the generated equations, generated during one or more iterations of blocks 302, 304, and 306, are sufficient to solve for the TB parameters (block 308), the flow continues to block 310 where the equations are solved to yield the TB parameters. As discussed with reference to FIG. 2, the TB linking module 142 may utilize any number of non-linear and/or linear equation solvers to obtain the TB parameters from the system of equations generated during iterations of blocks 302, 304, and 306.

Generating Environment Dependence Parameters and Models

The environment dependence model generator 144 may specially configure the computational modeling server 102 such that, when executed by the processors 138, the environment dependence model generator 144 causes the computational modeling server 102 to generate a model of dependence of TB parameters on changes in an environment of a material. Changes in the environment of the material may include, by way of example, variations in interatomic distances in the material, in atomic-coordinations in the material, alloy concentrations in the material, in strain in the material, in angular momentum of states in the material, in dimension of the periodicity in the material, or in surface passivation atoms in the material, etc. Generally, TB parameters may depend any one or combination of these and other changes in the environment of a material, and models generated by the environment dependence model generator 144 may describe, represent, or indicate this dependence.

Figure 4:
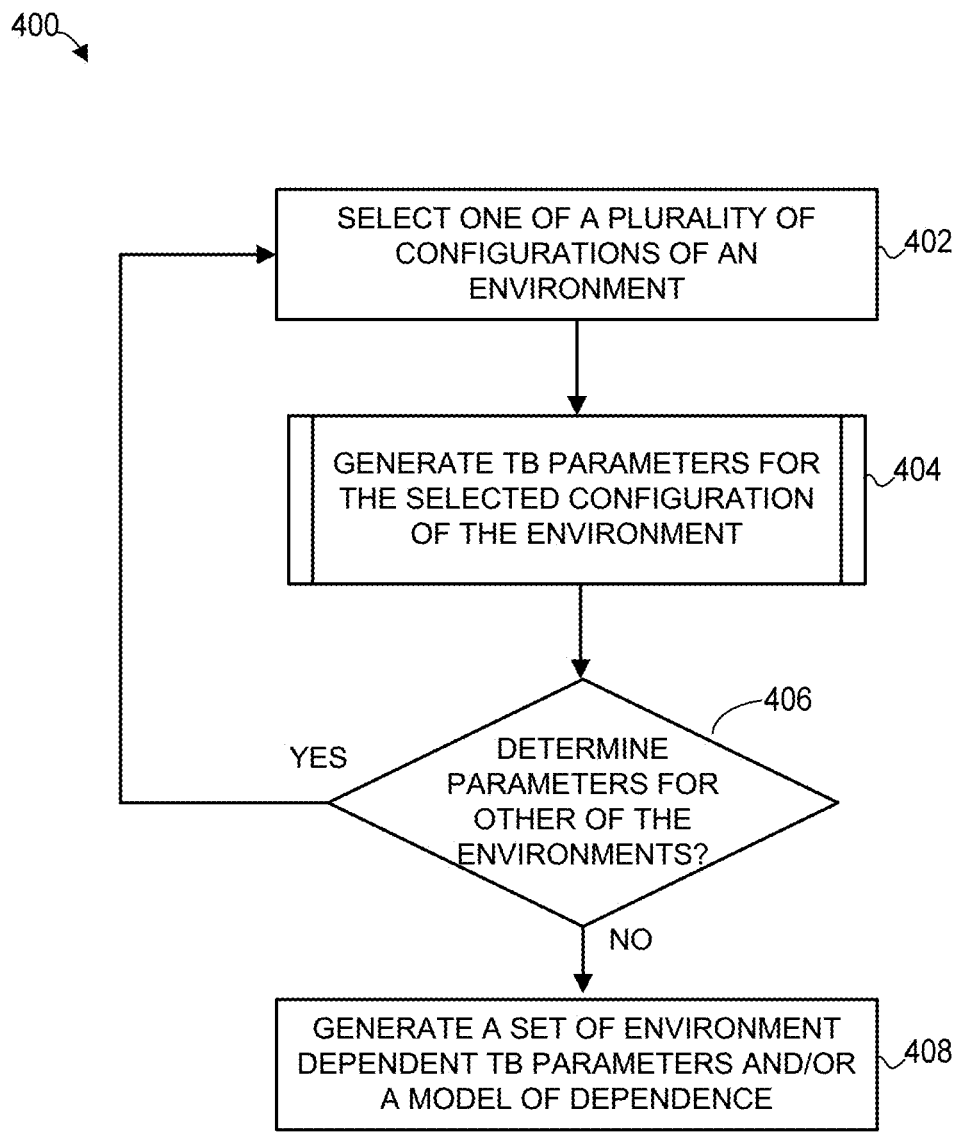
FIG. 4 is a flow diagram of an example method for determining environmental dependence of tight binding parameters which can be implemented in the system illustrated in FIG. 1.

FIG. 4 is a flow diagram of an example method 400 for generating a model of the dependence of TB parameters on variations in environment (e.g., an "environmentally-adapted" model). The environment dependence model generator 144 of the computational modeling server 102 may implement the method 400, for example.

To begin, one of a plurality of configuration or representations of an environment are selected (block 402). This selected configuration and other of the plurality of configurations may be indicated in the environment data 152 accessed by the environment dependence model generator 144, in an implementation. However, the selection of the one of the configurations of an environment may include reading a selections or definitions of an environment in configuration files communicated by the user devices 106, accessing environment data stored in the memory 132, or dynamically generating the selected configuration of an environment based on input to the environment dependence model generator 144 (e.g., from the user devices 106) or based on configurations of the environment dependence model generator 144 (e.g., stored in configuration or input files in the memory 132 or the data storage device 150). The selected configuration of the environment, along with the other configurations, may define various parameters of an environment of a material upon which TB parameters depend, such as interatomic distances in the material, alloy concentrations, etc.

TB parameters for the selected configuration of the environment are then generated (block 404). For example, the environment dependence model generator 144 may trigger the TB linking module 142 and/or the self-consistent calculation module 140 (via an suitable combination of transmitted messages or data) to generate TB for the selected configuration according to one or both of the example methods 200 and 300.

It is then determined if TB parameters for other configurations of the environment are to be generated (block 406). In some scenario, operators of the user devices 106 and/or the computational modeling server 102 may pre-configure the environment dependence model generator 144 (e.g., via a configuration or input file) to compute TB parameters for each of a plurality of pre-defined configurations of an environment. For example, an operator may input a configuration file to the environment dependence model generator 144 defining a plurality of alloy concentrations of a material to have the environment dependence model generator 144 generate a TB parameters and/or a model for the dependence of TB parameters on alloy concentration. In other scenarios, the environment dependence model generator 144 may dynamically (e.g., in near real time) determine a number of configurations of an environment for which TB parameters are to be generated. For example, the environment dependence model generator 144 may generate TB parameters for a default number of configurations, and then the environment dependence model generator 144 may determine if further TB parameters are to be generated for other configurations based on changes in the calculated TB parameters for the default configurations. Generally, a plurality of configurations of an environment may include any number and type of variations that are pre-determined (e.g., prior to the environment dependence model generator 144 implementing an instance of the method 400) or dynamically determined (e.g., during an instance of the method 400).

If TB parameters are to be generated for other configurations of an environment, the flow may revert to block 402. That is, the environment dependence model generator 144 may repeat blocks 402 and 404 for each of a plurality of configurations of the environment of a material. If it is determined that TB parameters are calculated for all of a number configurations of an environment (e.g., pre- or dynamically determined), the flow continues to block 408. At block 408, the environment dependence model generator 144 may generate a set of environment dependent TB parameters and/or a model of dependence corresponding to one or more TB parameters.

In some implementations, the environment dependence model generator 144 may output, at block 408, data indicative of the value of TB parameters at a variety of environment configurations. For example, the environment dependence model generator 144 may output values of TB parameters at each of a plurality of alloy concentrations, at each of a plurality of interatomic distances in a material, etc. (e.g., to the TB data 156). The environment dependence model generator 144 may also, or alternatively, determine and output a symbolic or numerical model of the dependence of TB parameters on one or more variations in an environment. For example, the environment dependence model generator 144 may fit a function of a TB parameter versus a variation (e.g., alloy concentration) to one or more model functions (e.g., polynomials or exponentials). In such an example, the environment dependence model generator 144 may generate one or more symbolically or numerically represented functions that indicate how TB parameters change with changes in an environment, even outside of discrete configurations of an environment utilized during blocks 402 and 404 of example method 400.

Environment Adapted and/or Ab-Initio Consistent TB Calculations

The TB calculation module 146 may specially configure the computational modeling server 102 such that, when executed by the processors 138, the TB calculation module 146 causes the computational modeling server 102 to perform one or more Tight Binding calculations, which TB calculation generates properties of materials, such as densities of states (DOSs). In particular, the TB calculation module 146 may utilize a Tight Binding model along with parameters, basis functions, environment dependence models, etc. generated by the TB linking module 142 and/or environment dependence model generator 144. Such a tight binding model may simulate or model extended electronic structures of materials, carrier transport, etc. Generation of TB parameters, environment dependence models, and/or basis functions utilized by the TB calculation module 146 is further discussed with reference to FIGS. 2, 3, and 4.

The tight binding model implemented by the TB calculation module 146 may include representations (e.g., via sparse matrices) of nearest neighbor (NN), second Nearest Neighbor (2NN), and/or any number of nearest neighbor couplings or interactions amongst the components (e.g., atoms) of a material. The tight binding model may also utilize a parameterized Hamiltonian (obviating a need to compute multi-center integrals) and an orthogonal basis (also allowing the use of sparce matrix representations). In some implementations, a matrix representation of the parameterized TB Hamiltonian may be sparse and represent only a few nearest neighbor interactions (e.g., NN and 2NN). However, the parameterized TB Hamiltonian may be dense, in some implementations, so as to represent many nearest neighbor interactions.

Figure 5:
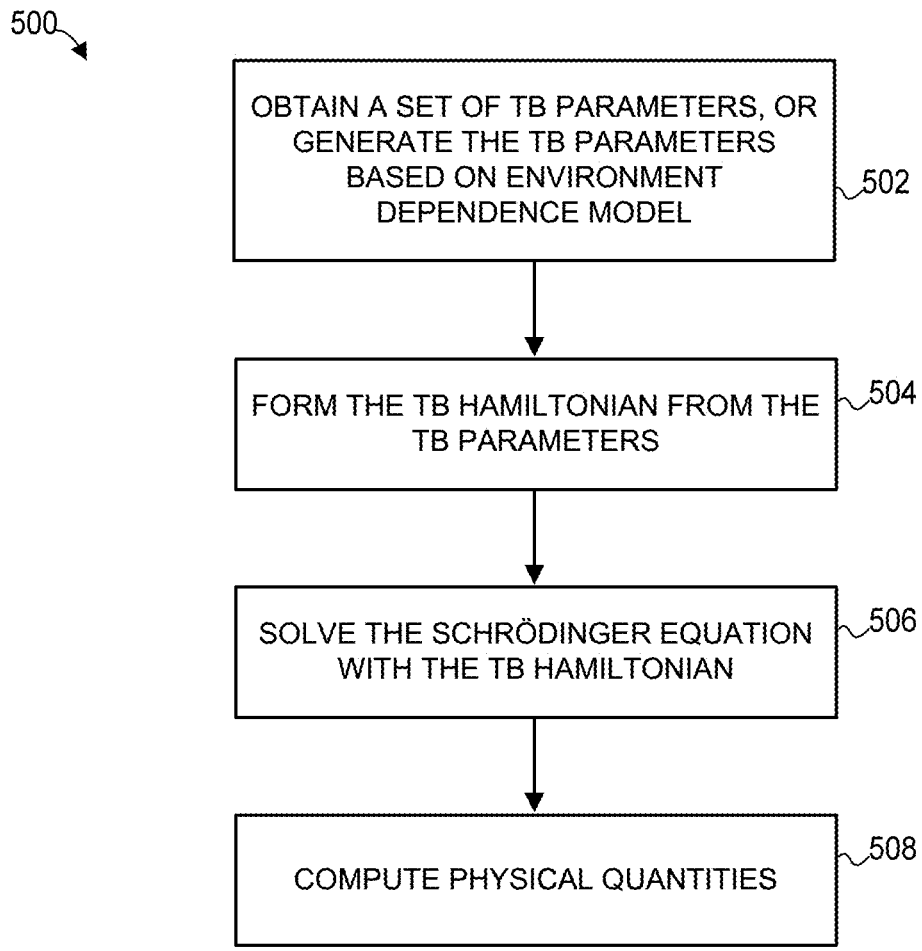
FIG. 5 is a flow diagram of an example method for performing tight binding calculations, with generated tight binding parameters, which can be implemented in the system illustrated in FIG. 1.

FIG. 5 is a flow diagram of an example method 500 for performing a tight binding computation with parameters derived from ab-initio calculation and/or at least partially based on an environment dependence model. The TB calculation module 146 of the computational modeling server 102 may implement the method 500, for example.

Referring to FIG. 5, a set of TB parameters are obtained or generated (block 502). The TB calculation module 146 may obtain TB parameters generated by the TB linking module 142 for a current material of interest, which parameters may be generated according to the example methods 200, 300, and/or 400. Alternatively or in addition, the TB calculation module 146 may obtain a model of dependence of TB parameters on variations in an environment from the environment dependence model generator 144, which model was developed according to the method 400. The TB calculation module 146 may then determine a particular set of TB parameters for the current material of interest based on the model of dependence of TB parameters on variations in an environment. For example, the TB calculation module 146 may determine TB parameters for the current material of interest by providing a configuration of the current material of interest (alloy concentration, inter-atomic distances, etc.) to functions of a model environment dependence model generator 144, which functions output the particular set of Tb parameters for the current material of interest.

The TB Hamiltonian is then formed based on the obtained, selected, or determined TB parameters and/or based on the environment dependence model (block 504). For example, the TB calculation module 146 may compute a variety of matrix elements of the TB Hamiltonian in terms of the TB parameters, TB basis functions, and/or other parameters of the tight binding model being utilized for the computation. The TB calculation module 146 may perform various numerical integrations, derivations, etc. to obtain these matrix elements, in some implementations.

The Schrödinger equation with the TB Hamiltonian is then solved (block 506). For example, the TB calculation module 146 may implement a variety of eigenvalue and/or eigenvalue solvers to solve the following problem:

$$H^{TB}|\Psi\rangle = E|\Psi\rangle,$$

where $H^{TB}$ is the tight binding Hamiltonian, E is an eigenvalue (e.g., energy), and $\psi$ are the eigenfunctions (e.g., wavefunctions) of the system. Generally, the TB calculation module 146 may implement any suitable numerical and/or symbolic solver to solve this problem, such a finite-difference solvers, finite-element solvers, etc.

Physical quantities of interest are then computed from the solutions of the Schrödinger equation described above (block 508). By way of example, the TB calculation module 146 may calculate electron and hole masses, energy band gaps, specific band energies at high symmetry points in the Brillouin zone (BZ), wave vector magnitudes at high symmetry points in the Brillouin zone (BZ), or any other property of interest derivable from eigenvalues (e.g., energies) and eigenfunctions (e.g., wavefunctions) of the Schrödinger equation with the TB Hamiltonian.

By utilizing TB parameters derived from ab-initio calculations (as described with reference to FIGS. 2 and 3) and which account for environment changes, some implementations of the TB calculation module 146 may be significantly transferable between many different systems on a variety of scales. For example, the TB calculation module 146 may implement the same types of TB parameters for use in bulk, strain, alloy, interface, and nanostructure simulations at a variety of scales (e.g., the generated tight binding parameters may be scaled to systems with a scale/size different from the size/scale of the system which is used to generated the tight binding parameters). In one scenario, the computational modeling server 102 may generate TB parameters, using the methods discussed above, for a microscopic material (e.g., consisting of no more than 100 atoms, 50 atoms, 10 atoms, 2 atoms, etc.). Then the TB calculation module 146 may utilize the same or a scaled version of the generated TB parameters for a macroscopic material (e.g., consisting of thousands of atoms). In this manner physically relevant and/or environmentally-adapted TB parameters may be utilized on a scale greater than that which can be modeled by ab-intio techniques, such as DFT.

Moreover, calculations of the TB calculation module 146 may utilize TB basis functions (defined by parameters generated by methods similar to the methods 200 and 300) including both occupied and excited orbitals that represent ab-initio (e.g., DFT) wavefunctions exactly, without changing a structure of the TB Hamiltonian. In this manner, TB calculations of the present disclosure (e.g., implemented by the TB calculation module 146) may retain consistency with and advantages of ab-initio calculations, while not sacrificing the scalability of TB methods. In fact, in contrast to arbitrary "fit-to-target" procedures commonly utilized in SETB calculations, the present TB methods (e.g., implemented by the TB calculation module 146) utilize a parameterization that is physically relevant and mathematically exact, regardless of the type of ab-initio (e.g., DFT) basis used.

Example Scenario—Hydrogen Molecule

In one scenario, the computational modeling server 102 may implement the techniques and functionality described with reference to FIGS. 2, 3, 4, and 5 to generate a model of the dependence of TB parameters on configurations on the environment of the hydrogen molecule. This scenario is provided by way of example, and it is understood that implementations of the current techniques may be applied to any suitable clusters, slabs, bulk solids, alloys, interfaces, regardless of the type of elements therein and the types of basis functions utilized.

Figure 6:
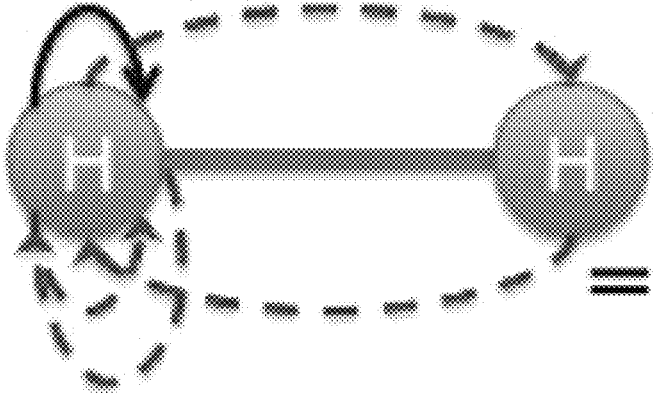
FIG. 6 illustrates a tight binding model of the hydrogen molecule.

For the hydrogen molecule, the TB calculation module 146 may utilize a tight binding model which represents the hydrogen molecule with two parameters, an on-site energy, $\varepsilon_s$, and a two-center integral, $V_{ss\sigma}$. This representation of the system is illustrated in FIG. 6. Closed paths of length one hop that begin and end on the same atom correspond to the first moment of the s angular momentum density of states. From the expression $\mu_{il}^{(m)} = \langle \phi_{il}|H^m|\phi_{il}\rangle$ discussed further with reference to FIG. 2, the first moment is:

$$\mu_{is}^1 = \langle \phi_{i,s}|H|\phi_{i,s}\rangle.$$

The right hand side of this expression is precisely the definition of the s on-site element $\varepsilon_s$. As such, $\varepsilon_s = \mu_{is}^1$, and the on-site element parameter of the TB model can be obtained directly from the first moment of the MRLDOS. Closed paths of length two that begin and end on the same atom correspond to the second moment of the s density of states. Two such paths exist as shown in FIG. 6 leading to:

$$\varepsilon_s^2 + V_{ss\sigma}^2 = \mu_{is}^2$$

Figure 7:
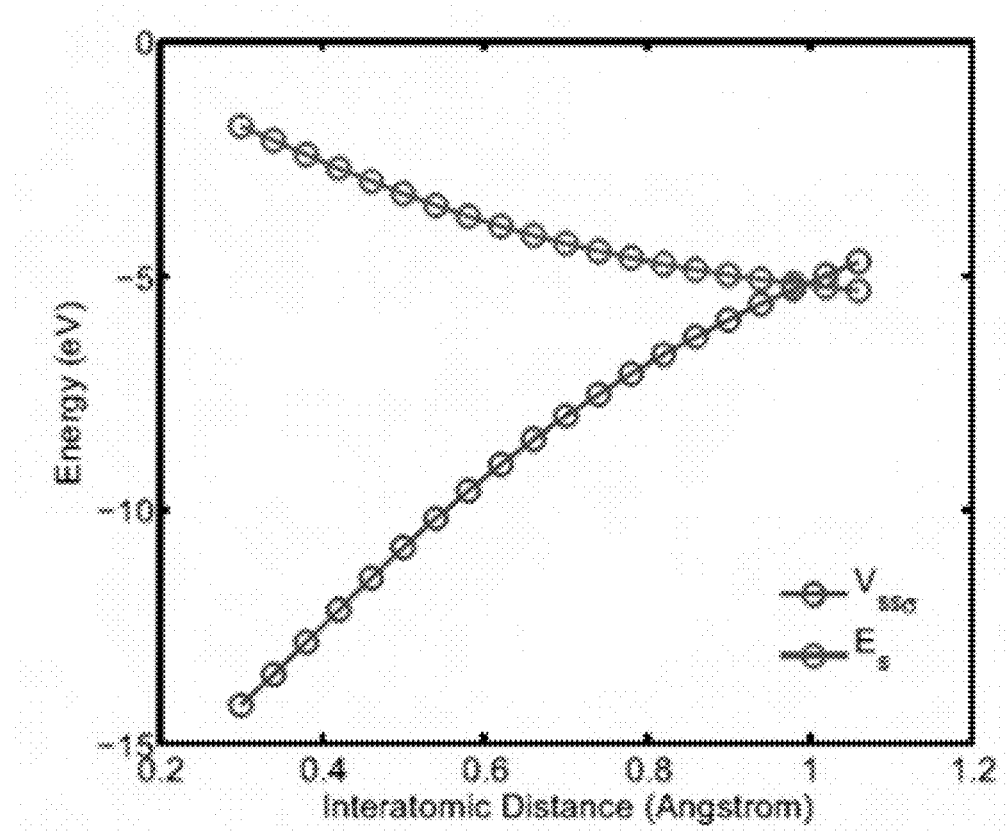
FIG. 7 illustrates dependence of tight binding (TB) parameters for the hydrogen molecule on interatomic distances.

Thus, the system of equations utilized by the TB calculation module 146 may include $\varepsilon_s = \mu_{is}^1$ and $\varepsilon_s^2 + V_{ss\sigma}^2 = \mu_{is}^2$, and, by solving these equations, the TB calculation module 146 may obtain values for the parameters $\varepsilon_s$ and $V_{ss\sigma}$. As discussed with reference to FIG. 4, the environment dependence model generator 144 may repeat this process or calculation for a variety of configurations of environment. In one example, the environment dependence model generator 144 may repeat this process for a number of interatomic distances such that a dependence of $\varepsilon_s$ and $V_{ss\sigma}$ on changes in the environment emerge naturally. This dependence, as calculated in this manner, is illustrated in FIG. 7. As illustrated in FIG. 7, the environment dependence model generator 144 may fit various discrete TB parameter values (represented by circles) with model functions (represented by solid lines). In particular, the environment dependence model generator 144 may fit the dependence of $\varepsilon_s$ and $V_{ss\sigma}$ on interatomic distance (or strain) to exponential functions, in this scenario.

Example Scenario—Cu

It has been described in above scenario how the first moment of an MRLDOS may correspond to on-site energies. In another scenario, the computational modeling server 102 may determine the functional form for on-site energies in a TB model of Cu (e.g., implemented by the TB calculation module 146) based on a DFT calculation using a Generalized Gradient Approximation (GGA).

Figure 8:
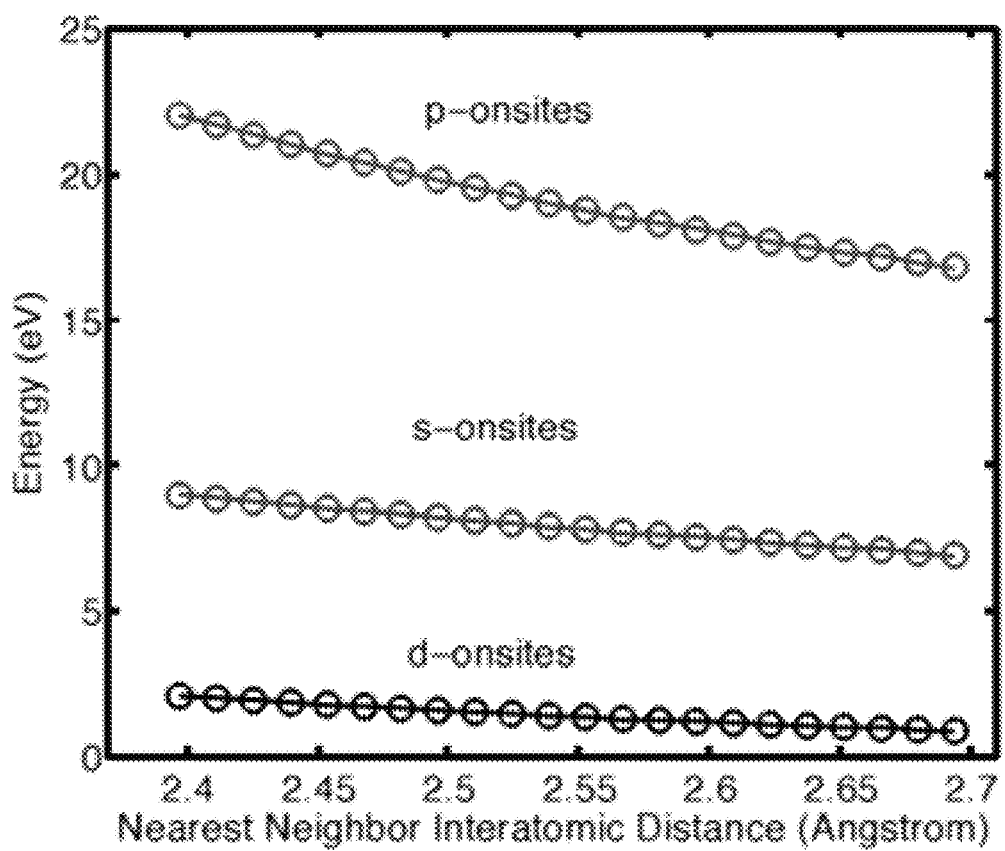
FIG. 8 illustrates dependence of TB parameters for Cu on interatomic distances.

In this scenario, the TB linking module 142 may compute first moments of s, p and d angular momentum from a MRLDOS, where the MRLDOS is generated from the DFT calculation using the GGA functional. Further, in conjunction with the TB linking module 142 or otherwise, the environment dependence model generator may repeat such computations to determine dependence of the first moments on an environment of Cu. In particular, FIG. 8 illustrates the dependence of the first moments of s, p and d, or on-site energy TB parameters, on nearest neighbor inter-atomic distance. Again, the environment dependence model generator 144 may fit the dependence of on-site energy TB parameters to exponential functions, in this scenario. This exponential model generated by the environment dependence model generator 144 may take the form:

$$E_{l,i} = \varepsilon_l + \sum_{j=NN,m} I_{l,m} \exp\left[-p_{l,m}\left(\frac{R_j}{R_0} - 1\right)\right]$$

where I represents the different angular momenta. This functional form further suggests the use of exponentially decaying on-site, off-diagonal terms in the TB Hamiltonian of the tight binding model for Cu:

$$I_{l,l',m} = I_{0l,l',m} \exp\left[-p_{l,l',m}\left(\frac{R_{i,j}}{R_0} - 1\right)\right]$$

where p is the decay exponent for the intra-atomic matrix elements I.

Example Scenario—Bulk Si

In a scenario in which bulk Si is a material of interest, the TB linking module 142 may link TB parameters for bulk Si to energy moments, as further discussed with reference to FIGS. 2 and 3. In particular, the TB linking module 142 may obtain an MRLDOS calculated by the self-consistent calculation module 140 (e.g., using an orthonormalized DFT localized basis for Si). The TB linking module 142 may then form a system of six non-linear equations linking moments from the MRLDOS to TB parameters, such as on-site energies ($\varepsilon_s$, $\varepsilon_p$, etc.) and two-center integrals (e.g., $V_{ss\sigma}$), for bulk Si, which linking and formation of equations is also further discussed with reference to FIGS. 2 and 3. For angular momentum s, $\mu_s^{(1)} = \varepsilon_s$ $\mu_s^{(2)} = \varepsilon_s^2 + 4V_{ss\sigma}^2 + 4V_{sps}^2$ $\mu_s^{(3)} = \varepsilon_s^3 + 8\varepsilon_s V_{sp\sigma}^2 + 12\varepsilon_s V_{ss\sigma}^2 + 4\varepsilon_p V_{sp\sigma}^2$ and, for angular momentum p (either $p_x$, $p_y$, or $p_z$—for the total MRLDOS all equations are multiplied by three):

$\mu_p^{(1)} = \varepsilon_p$ $\mu_p^{(2)} = \varepsilon_p^2 + 8/3 V_{pp\pi}^2 + 4/3 V_{pp\sigma}^2 + 4/3 V_{sp\sigma}^2$ $\mu_p^{(3)} = \varepsilon_p^3 + 8\varepsilon_p V_{pp\pi}^2 + 4\varepsilon_p V_{pp\sigma}^2 + 8/3\varepsilon_p V_{sp\sigma}^2 + 4/3\varepsilon_p V_{sp\sigma}^2$ The TB linking module 142 may solve these six non-linear equations for the TB parameters ε and V These TB parameters may then be utilized in a TB calculation for certain properties of bulk Si and/or other materials. Further, the environment dependence model generator 144 may generate values for or a model of TB parameters ε and V as a function of various changes to the bulk Si environment, such as changes in interatomic distances in the material, in atomic-coordinations in the material, alloy concentrations in the material, in strain in the material, angular momentum of states in the material, etc.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A method for modeling a material at least partially-defined by atomic information, the method comprising:
    for each of a plurality of configurations of the material:
    determining, by a linking module of a computing system, energy moments for a density of states of the respective configuration of the material;
    generating, by the linking module, a tight binding Hamiltonian matrix for the respective configuration of the material; and
    forming, by the linking module, a tight binding model of the configuration of the material by resolving a linking of the energy moments for the density of states of the material to the tight binding Hamiltonian matrix for the material.

2. The method of claim 1, further comprising based on the tight binding models for each of the configurations of the material, forming an environmentally-adapted tight binding model, wherein the environmentally-adapted tight binding model models the material for environmentally-dependent variations in the atomic information of the material.

3. The method of claim 2, wherein the environmentally-dependent variations in the atomic information of the material comprise variations (i) in interatomic distances in the material, (ii) in atomic-coordinations in the material, (iii) in alloy concentrations in the material, (iv) in strain in the material, (v) in angular momentum of occupied states in the material, (vi) in dimension of the periodicity in the material, or (vii) in surface passivation atoms in the material.

4. The method of claim 3, wherein the environmentally-dependent variations are represented at least partially in the plurality of configurations of the materials, wherein each of the plurality of configurations of the material defines a variation of the atomic information different than that defined by any other of the plurality of configurations.

5. The method of claim 1, wherein determining the energy moments for the density of states of the respective configuration of the material comprises:
- performing a Kohn-Sham Density Functional Theory computation to obtain eigenvalues and eigenvectors corresponding to the material;
- computing the density of states from the eigenvalues and eigenvectors; and
- computing the energy moments based on the density of states.

6. The method of claim 1, wherein the density of states is an angular momentum resolved local density of states.

7. The method of claim 1, wherein the tight binding Hamiltonian matrix is at least partially expressed in terms of one or more tight binding parameters, wherein the tight binding model includes determined values of the one or more tight binding parameters, wherein generating the tight binding Hamiltonian matrix for the respective configuration of the material includes forming the tight binding Hamiltonian matrix as a symbolic tri-diagonalized matrix, wherein components of the symbolic tri-diagonalized matrix are expressed in terms of the one or more tight binding parameters.

8. The method of claim 6, wherein forming the tight binding model by resolving the linking of (i) the energy moments for the density of states of the material to (ii) the tight binding Hamiltonian matrix for the material elements includes forming a series of expressions linking the energy moments to components of a symbolic tri-diagonalized matrix.

9. The method of claim 7, wherein forming the tight binding model further includes collectively solving a series of expressions to obtain the one or more tight binding parameters.

10. The method of claim 7, wherein a series of expressions is a system of non-linear equations.

11. The method of claim 2, wherein the tight binding Hamiltonian matrix is at least partially expressed in terms of one or more tight binding parameters, wherein the tight binding model includes determined values of the one or more tight binding parameters, wherein forming an environmentally-adapted tight binding model includes fitting the one or more tight binding parameters for the plurality of configurations of the materials to one or more model functions.

12. The method of claim 1, wherein the material is either one or a suitable combination of the following classes of materials: a semiconductor, a binary semiconductor alloy, a target or ternary semiconductor alloy, a metal/semiconductor heterostructure, a metal-dielectric-semiconductor nano structure, an insulator-dielectric nano structure, a metal-dielectric nano structure, or a metal-metal nano structure.

13. A method of a modeling a macroscopic material, the method comprising:
- applying the method of claim 1 to microscopic material as the material at least partially-defined by the atomic information, the microscopic material being formed of no more than 100 atoms; and
- scaling the environmentally-adapted tight binding model of the microscopic material into the macroscopic material.

14. The method of claim 12, wherein the microscopic material is formed of no more than 50 atoms, no more than 10 atoms, or no more than 2 atoms.

15. The method of claim 12, wherein the microscopic material is either one or a suitable combination of the following classes of materials: a III-V semiconductor material, a group IV semiconductor material, a metal, a polymer, or an insulator.

16. A non-transitory computer-readable storage medium having stored thereon a set of instructions that specially configure a computing device such that, when executed by one or more processors, the instructions cause the computing device to:
for each of a plurality of configurations of a material:
- determine energy moments for a density of states of the respective configuration of the material;
- generate a tight binding Hamiltonian matrix for the respective configuration of the material; and
- form a tight binding model of the configuration of the material by resolving a linking of the energy moments for the density of states of the respective configuration of the material to the tight binding Hamiltonian matrix for the respective configuration of the material.

17. The non-transitory computer-readable storage medium of claim 16, further comprising based on the tight binding models for each of the configurations of the material, form an environmentally-adapted tight binding model, wherein the environmentally-adapted tight binding model models the material for environmentally-dependent variations in the atomic information of the material.

18. The non-transitory computer-readable storage medium of claim 16, wherein the tight binding Hamiltonian matrix is at least partially expressed in terms of one or more tight binding parameters, wherein the tight binding model includes determined values of the one or more tight binding parameters, wherein generating the tight binding Hamiltonian matrix for the respective configuration of the material includes:
- generating the tight binding Hamiltonian matrix as a symbolic matrix, wherein components of the symbolic matrix include the one or more tight binding parameters;
- recursively converting the symbolic matrix to a tri-diagonalized symbolic matrix.

19. The non-transitory computer-readable storage medium of claim 17, wherein the one or more right binding parameters include an on-site energy parameter.

20. The non-transitory computer-readable storage medium of claim 17, wherein the one or more right binding parameters include one or more two-center integral parameters.

* * * * *